Dec. 13, 1949     F. M. THUNEY     2,490,932
CONTROL APPARATUS
Filed May 31, 1945
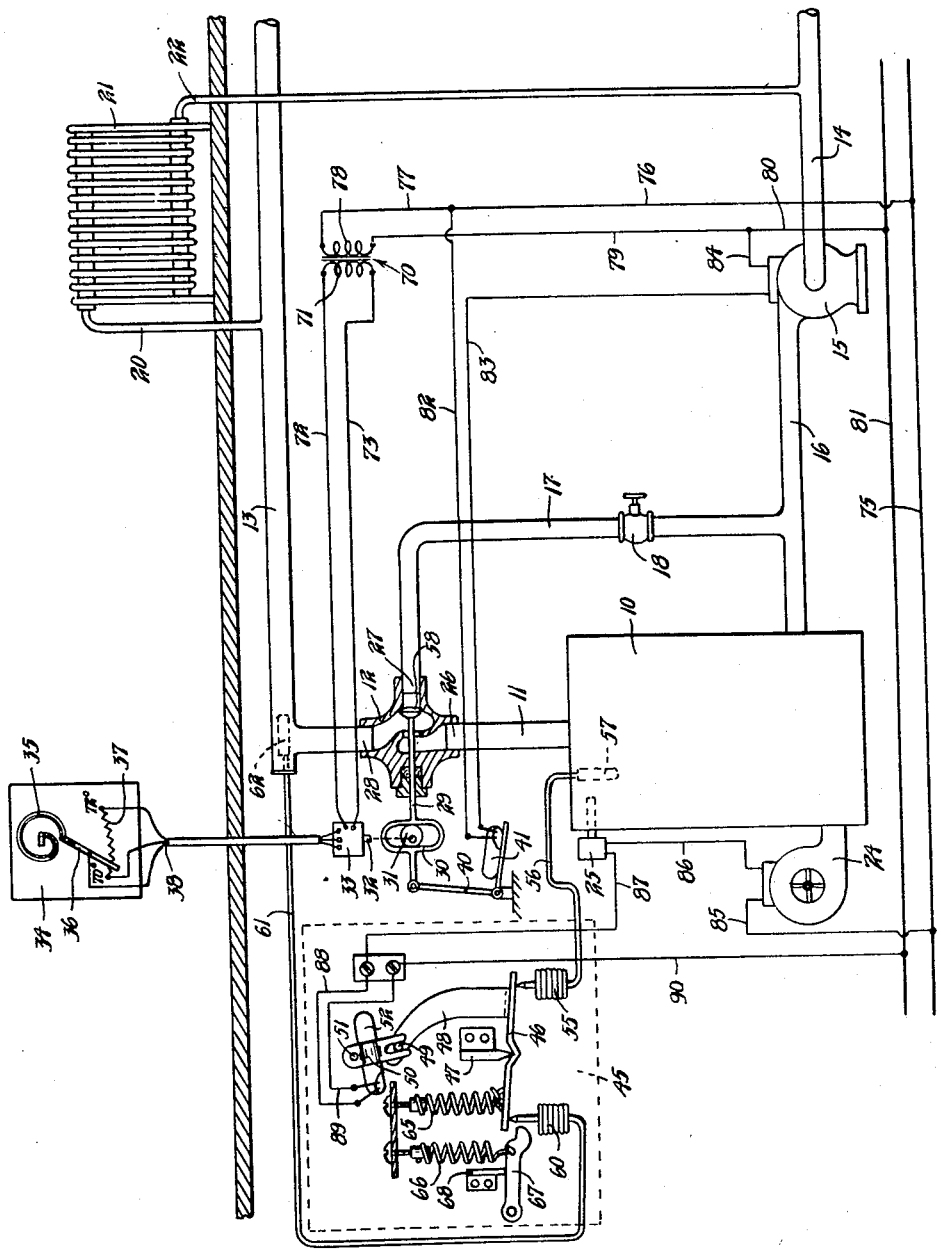
INVENTOR
FRANCIS M. THUNEY
BY George H. Fisher
ATTORNEY Patented Dec. 13, 1949

2,490,932

UNITED STATES PATENT OFFICE 2,490,932

CONTROL APPARATUS

Francis M. Thuney, Minneapolis, Minn., assignor to Minneapolis-Honeywell Regulator Company, Minneapolis, Minn., a corporation of Delaware Application May 31, 1945, Serial No. 596,915

11 Claims. (Cl. 237—8)

The present invention relates to apparatus for controlling the temperature of the fluid heat exchange medium of a temperature changing system in response to the load demands of said system.

In controlling temperature changing apparatus, such as a heating system, it is not only desired to maintain the temperature of a space or the like within desired limits, but also to realize maximum economy of fuel. While prior control and temperature changing apparatus has done fairly well in providing good control and economy, better results are needed. The present invention meets this need by improving the control of a good type of control apparatus and by notable improvement in the economy of operation of the temperature changing equipment.

It is therefore an object to provide improved control equipment for temperature changing apparatus.

It is another object to provide control apparatus effective under a wide range of load conditions and which permits maximum economy of operation of the temperature changing equipment under all load conditions.

It is a more specific object to provide control apparatus for a hot water heating system wherein the temperature of the water supplied to the heat exchangers is controlled in response to demand by controlling a suitable valve and wherein the operation of the boiler is controlled in response to the differential of boiler water temperature and the temperature of the water supplied to said heat exchangers.

It is a further object to provide control apparatus equally adaptable for heating systems using air or water as the heat transmitting medium, or for cooling systems using a fluid heat exchange medium.

It is another object to control a primary temperature changing means in a manner to provide no more temperature change than is required to meet load requirements and to permit proper control.

It is a further object to provide temperature control apparatus wherein the component parts are readily available and dependable in nature.

Additionally, it is also an object to provide a control system of such nature that it can be readily installed and connected by persons of ordinary skill and which requires a minimum of adjusting and the like to secure the desired results.

These and other objects will become apparent upon a study of the following specification and drawing.

The single figure of the drawing is a schematic showing of the present control apparatus applied to a forced circulation hot water heating system.

While the present invention is shown applied to a forced circulation hot water heating system, it is equally adaptable to a forced circulation heated air system, or to cooling apparatus. Referring to the drawing, boiler 10 supplies heated water through pipe 11 and three-way valve 12 to supply main 13. The return line of the system comprises return main 14, circulator 15, and pipe 16 to boiler 10. A by-pass pipe 17, including adjustable restrictor means 18, extends between pipe 16 and three-way valve 12. Heat from the system may be utilized by heated water from supply main 13 flowing through pipe 20 to heat exchanger 21 located in a space to be warmed. The return flow from heat exchanger 21 takes place through pipe 22 to return main 14.

Boiler 10 represents any conventional hot water heating boiler and may be fired in any controllable manner. As shown, an electrically controlled oil burner 24 is used to supply heat. Obviously, gas burners or a stoker may be used equally well. As a safety device, limit switch 25 may be used in the oil burner control circuit to prevent dangerous overheating of the boiler.

Three-way valve 12 may be any conventional three-way valve and includes inlet port 26, by-pass port 27, and outlet port 28. Reciprocably movable valve member 58 is adjusted by valve stem 29 to control flow from port 26 or port 27, or both, to port 28 of said three-way valve. In the position shown, the by-pass port 27 is closed and full flow is permitted from port 26 to port 28. As valve member 58 is moved to the left, the flow from port 26 to 28 is gradually diminished and the flow from port 27 to port 28 is gradually increased until at a point where valve member 58 is at its extreme left position, full flow is permitted from port 27 to port 28 and no flow takes place from port 26 to port 28. Valve stem 29 is adjusted by yoke member 30 cooperating with rotatable cam member 31. Cam 31 is driven by shaft 32 of a suitable geared motor 33, which in turn is controlled by a thermostat 34 located in the space being heated. While any motor and thermostat arrangement can be used that permits a gradual action in controlling the position of the valve stem 29, motor 33 and thermostat 34 are preferably of the type shown in Taylor Patent 2,028,110. As proportioning motors of the sort described in the Taylor patent are commonly used in the control art and familiar to those skilled in the said art, the motor circuit has not been specifically shown and the thermostat construction is schematically shown only for a purpose which will appear.

Thermostat 34 is a conventional one used in proportioning circuits. It comprises a bimetallic element 35, a movable switch blade 36 actuated thereby, and a resistor 37 over which said blade is movable. Blade 36 and resistor 37 of thermostat 34 are connected in controlling relation to motor 33 by wiring generally referred to as 38 and the said thermostat is so related to motor 33 that when blade 36 is at the extreme left position, corresponding to a room temperature of 70°, for instance, valve stem 29 is adjusted to its extreme right position. When arm 36 is at its extreme right position, corresponding to a temperature of 72°, for instance, valve stem 29 will be moved to its extreme left position. In addition to moving valve stem 29, yoke 30 also operates pivoted bell-crank lever 40 which actuates mercury switch means 41. Mercury switch means 41 controls circulator 15 in a manner to be described.

In addition to limit or safety means 25 controlling the action of burner 24, a differential temperature responsive device 45 is the main controlling means for said burner. Device 45 includes a bar means 46, pivoted on a knife-edged member 47, and having an attached switch actuating arm 48. Arm 48 includes a pin 49 which coacts with a lever 50, pivoted at 51, which carries mercury switch 52. A bellows device 55, connected by tube 56 to bulb 57 in the upper portion of boiler 10, tends to rotate bar 46 in a counterclockwise direction. The force exerted by bellows device 55 on bar 46 is resisted by bellows device 60, connected by tube 61 to bulb 62 located in supply main 13. Bellows device 60 is assisted in its opposition to bellows device 55 by adjustable spring means 65. In addition, adjustable spring means 66, acting through pivoted lever 67, assists spring means 65 for a portion of the movement of bar member 46. However, the amount of movement that can be caused by spring means 66 is limited by stop means 68 coacting with pivoted lever 67. Device 46, as described, will be recognized as a differential temperature responsive means wherein spring means 65 determines the difference in temperature required at bulbs 57 and 62 to cause actuation of switch 52 and wherein adjustable spring means 66 determines the differential of the instrument or, in other words, determines the difference between the cut-in and cut-out points of the instrument.

Adjustable restrictor means 18 is not necessary in the practice of the present invention but is useful in balancing the fluid resistance of by-pass 17 with that through boiler 10 to thereby give better control results at three-way valve 12. Circulator 15 may obviously be of any suitable sort and may even be omitted, but its omission is not recommended.

If the present apparatus were a forced air heating system instead of a forced circulation hot water system, boiler 10 would then be a hot air furnace, circulator 15 would be a blower, and three-way valve 12 would become a suitable damper means. Bulb 62 would then respond to the temperature of the mixed air supplied to the rooms and bulb 57 would respond to the bonnet temperature of the furnace. The equivalent parts in a cooling system would comprise the use of cooling means instead of boiler 10 and cooling medium circulating through the pipes shown, instead of heated water. Obviously, the cooling means could be of any controllable sort.

For a better description of the present apparatus, its operation will now be discussed.

*Operation*

With the apparatus placed in operation by closing a suitable main switch, not shown, and with the parts in the positions shown, it is noted that arm 36 of thermostat 34 is at its extreme left position indicating a room temperature of about 70°. As this is the coolest temperature desired in the room, the heating apparatus operates, as will be noted, at its maximum capacity to raise the room temperature. Thermostat 34, due to blade 36 being at its extreme left position and through wiring 38, controls motor 33 to position cam 31 in a manner to cause maximum flow of water through boiler 10 and minimum flow through by-pass 17. The actuating current for motor 33 is obtained by the following circuit: secondary 71 of transformer 70, wire 72, motor 33, and wire 73 back to said secondary winding. The primary winding of transformer 70 is energized from the line wires by the following circuit: line wire 75, wire 76, wire 77, primary winding 78 of transformer 70, wire 79, wire 80, and line wire 81.

With a demand for heat, circulator 15 is energized by the circuit: line wire 75, wire 76, wire 82, mercury switch 41, wire 83, circulator 15, wire 84, wire 80, and line wire 81. Circulator 15 is controlled by switch 41 in a manner to keep the said circulator operating at all times that there is an appreciable demand for heat. However, when valve 12 is operated in a manner to by-pass substantially all of the return water supply, thereby indicating a minimum load on the system, the switch 41 is tipped counterclockwise sufficiently to open its contacts thus stopping circulator 15. Obviously, there is no particular advantage in circulating water through the system unless heat is being added to the same.

With a maximum load on the heating system, and with water being circulated through the boiler directly to the supply main 13 and with substantially no water being passed through by-pass 17, the temperature of the water in supply main 13 is very close to that in boiler 10 and the differential in temperature between bulbs 57 and 62 is small. Therefore, mercury switch 52 is tipped to close its contacts and burner 24 is energized as follows: line wire 75, wire 85, burner 24, wire 86, safety limit control 25, wire 87, wire 88, mercury switch 52, wire 89, and wire 90 to line wire 81. While device 45 may be adjusted to hold any desired differential between boiler water temperature and supply main temperature, it may, for instance, be set to maintain a differential of 10° between bulbs 57 and 62, bulb 57 being in the hotter water. This adjustment is made by properly adjusting spring means 65. In addition, to prevent excessive cycling of burner 24, the instrument differential is adjusted by adjusting spring means 66. This may be adjusted to a suitable value, such as 4°, so that there will be a 4° difference in temperature required between cut-in and cut-off points of switch 52. As now adjusted, device 45 will act to maintain a differential between bulbs 57 and 62 of between 10 and 14 degrees. When the temperature at bulb 57 drops to a value only 10° in excess of that of bulb 62, the combined forces of spring means 65 and bellows device 60 is sufficient to tip mercury switch 52 to an "on" position thereby energizing burner 24 by the aforementioned circuit. When bulb 57 becomes 14° hotter than bulb 62, the pressure of bellows device 55 is sufficient, in relation to the pressure exerted by bellows device 60 and spring means 65 and 66, to overcome the latter means and tip switch means 52 to "off" position, thereby deenergizing burner 24.

As before mentioned, in the position shown, boiler 10 is operating, full flow is taking place through boiler 10, a three-way valve 12 and supply main 13, and no flow is taking place through by-pass 17. Therefore, the differential temperature between bulbs 57 and 62 is a minimum and the burner continues operating with limit device 25 acting as the ultimate controller of burner 24 until the differential temperature increases sufficiently for device 45 to assume control. In any properly designed heating plant, however, full operation of the said heating plant quickly satisfies the demand in the space. As the temperature in the space rises and arm 36 of thermostat 34 is moved to the right across resistor 37, motor 33 adjusts three-way valve 12 to lessen the flow through boiler 10 and to increase flow through by-pass 17. As the water delivered through by-pass 17 is taken from the return supply, it is at a lower temperature than that heated in the boiler. Therefore its admixture with the water heated in the boiler tends to lower the mixture temperature, hence the temperature of the water in supply main 13 becomes less than that of the water delivered by the boiler, thus increasing the temperature differential between bulbs 57 and 62. When bulb 57 responds to water 14° hotter than that affecting bulb 62, bellows device 55 is able to rotate member 46 against spring means 65 and 66 and bellows device 60 sufficiently to open the contacts of switch 52 and deenergize burner 24.

With burner 24 no longer supplying heat to boiler 10, the temperature of the water in the boiler gradually diminishes and the differential temperature between bulbs 57 and 62 decreases. When this differential temperature reaches 10°, the combined power of bellows device 60 and the spring means is able to overcome bellows device 55 sufficiently to tip switch 52 to "on" position and again start burner 24, as previously described. However, with the furnace intermittently energized and with heat being supplied continuously by heat exchange means 21 due to constant circulation caused by circulator 15, the space temperature, especially if the load be light, tends to rise. As the temperature tends to rise and arm 36 is moved to the right, valve 12 is operated in a manner to permit more by-passing of return water, thereby resulting in a lowered temperature of the water supplied heat exchanger 21 and again tending to increase the differential temperature between bulbs 57 and 62. Separating the functions of device 45 and thermostat 34 acting in conjunction with motor 33 and valve 12, for discussion purposes, it is noted that thermostat 34, motor 33, and three-way valve 12 control the present heating system in a manner to continuously supply heated water to heat exchange means 21 at a temperature just right to meet the load demand. If the temperature tends to rise in the space, thermostat 34 controls valve 12 to by-pass more return water and lower the temperature of the water supplied the heat exchanger whereas, if the temperature tends to fall, thermostat 34 controls valve 12 to by-pass less return water and to deliver more heated water from boiler 10 to heat exchanger 21. However, by means of device 45, the burner of boiler 10 is operated to provide sufficient heat to heat the water in said boiler to a temperature not less than 10° nor more than 14° hotter than the water being supplied the heat exchanger.

Then, as the load on the system decreases, and the temperature of the water supplied the heat exchangers decreases, the temperature of the water in the boiler is also permitted to decrease. For instance, if, under full load conditions, a water temperature of 200° at heat exchanger 21 is required to satisfy the load demands, the boiler temperature will fluctuate between 210 and 214 degrees. However, if the supply water temperature is gradually lowered due to decrease in load requirements, to a temperature of, say 120°, the boiler water temperature will fluctuate between 130 and 134 degrees. Operating the boiler at 130° results in substantially less fuel consumption than when operating at a boiler temperature of 210°. As heating plants generally operate at less than full load conditions, it is of considerable practical importance to increase the efficiency of the heating plant under such partial load conditions.

A careful consideration of the present apparatus will reveal another advantage in the present control system. It is a characteristic of many three-way valves that more positive response is had in their controlling functions as the valve member nears either end position. When the valve member is intermediate the valve seats, a substantial movement is required in either direction to effect a noticeable variation in the diversion of flow. As the tendency in the present system is to require a small amount of by-pass circulation, the valve member 12 is near an end position and quick response is had upon slight movement of the said valve member in either direction. In other words, a slight change in room temperature causes a prompt variation in the temperature of the water supplied to the heat exchanger warming the room. The same condition holds true when nearly all of the return water tends to be by-passed and only a small portion is going to the burner. This condition results when the room temperature has risen nearly to its upper limit. As valve member 12 approaches its extreme left position, only a slight movement of same is necessary to cause an appreciable change in the temperature of the water supplied to the heat exchanger. The inherent characteristics of three-way valves thus cooperate effectively with the present control system to provide desirable control of temperature with increased responsiveness near either end of the throttling range defined by the thermostat to prevent both undershooting and overshooting of temperature. The present apparatus is thus seen to give proper control results and at the same time permit maximum fuel economy due to lowering effective boiler water temperature under light load conditions.

Upon studying the present specification and drawings, many equivalents and substitutions become apparent. Further, as the present description is for the purpose of illustration only and as the specific examples are not to be considered in a limiting sense, the scope of the present invention is to be determined only by the appended claims.

I claim as my invention:

1. In a forced circulation hot water heating system including a boiler having combustion control means, a supply conduit from the boiler, a return conduit to the boiler, a conduit from said return conduit to said supply conduit by-passing said boiler, means for controlling flow through said by-pass conduit, and control means comprising, in combination, means responsive to a condition indicative of the need for operation of said flow controlling means for regulating said flow controlling means, switch means for controlling said combustion control means, and differential temperature responsive means for operating said switch means, said differential temperature responsive means including one element responsive to the temperature of the water in said supply conduit downstream of the junction of said supply conduit and said by-pass conduit and another element responsive to the temperature of the water in said boiler.

2. In heating apparatus for a space, first means for conducting heat exchange medium to said space, second means for conducting heat exchange medium from said space, mean for heating said medium, means for circulating heat exchange medium through said first and second means and said heating means, means for also circulating said medium in by-pass relation to said heating means, and means responsive to the difference in temperature of the medium circulated to the said space and the medium being circulated through said heating means for controlling said heating means.

3. In a heating system of the sort wherein a heat exchange medium is heated by heater means and circulated to heat exchange means and returned to the heater means for further heating, means for controlling said system comprising, in combination, means for circulating said return heat exchange medium in by-pass relation to said heater means to lower the temperature of the medium circulated to the heat exchange means, means for controlling said by-pass means, and means responsive to the difference in temperature of the medium circulated to the heat exchange means and the medium circulated through the heater means for controlling said heater means.

4. In a heating system of the sort wherein a heat exchange medium is heated by heater means and circulated to heat exchange means and returned to the heater means for further heating, means for controlling said system comprising, in combination, means for circulating a portion of said return heat exchange medium in by-pass relation to said heater means to lower the temperature of the medium circulated to the heat exchange means, means for varying the portion of medium by-passed around said heater means, and temperature responsive means for controlling said heater means including means responsive to the temperature of the heat exchange medium in said heater means and means responsive to the temperature of the medium supplied said heat exchange means.

5. In a circulating hot water heating system having heat exchangers and a water heating means, a differential temperature control device for controlling said water heating means, said device including one temperature responsive element arranged to respond to the temperature of the water supplied to said heat exchangers and another element arranged to respond to the water temperature in said heating means, said device being operable to control said heating means in a manner to maintain a predetermined temperature difference between said elements, means responsive to a condition indicative of a need for heat from said heat exchangers, by-pass means around said heating means including flow control apparatus for causing a reduction in the temperature of the water circulated from said heating means, said by-pass means being arranged in said circulating system between said heating means and the first named temperature responsive element, and means connecting said condition responsive means in controlling relation to said flow control apparatus.

6. In a temperature changing system including means for circulating a heat exchange medium to a space, temperature changing means for changing the temperature of said medium in one sense, by-pass conduit means including a flow control device located in said circulating system between said temperature changing means and said space for changing the temperature of said medium in an opposite sense, thermostatic means responsive to temperature in said space for controlling said flow control device, and differential temperature responsive means for controlling said temperature changing means in a manner to maintain a predetermined difference between the temperature of said medium in said temperature changing means and the temperature of said medium in said system between said by-pass conduit means and said space.

7. In a hot water heating system having heat exchange means and a boiler connected by supply and return piping, a by-pass conduit between said return and supply piping and around said boiler, valve means for controlling the relative flows through said by-pass and said boiler, temperature responsive means connected in controlling relation to said valve means, and differential temperature responsive means connected in controlling relation to said boiler, said differential temperature responsive means being responsive to the temperature of the water supplied to said heat exchange means and to the temperature of the water supplied by said boiler and operating to maintain a predetermined difference in said water temperatures.

8. In a heating system including heater means and a space to be heated, fluid conduit means for conducting heated fluid from said heater means to said space, additional conduit means arranged in by-pass relation to said heater means for mixing unheated fluid with said heated fluid, flow control means for adjusting the relative flows through both of said conduit means, first temperature responsive means responsive to the temperature in said space connected in controlling relation to said flow control means, and means responsive to a condition indicative of the temperature differential on opposite sides of said flow control means for controlling said heater means.

9. In a heating system for a space, means for heating a medium, means for circulating said heated medium to said space, controllable means between said heating means and said space for reducing the temperature of said circulating medium between the heating means and said space to a value less than that at which it leaves said heating means, means responsive to the temperature of said space for controlling said temperature reducing means, and control means responsive to a condition indicative of the temperature differential on opposite sides of said controllable means for controlling said heating means in such a manner that the temperature of the medium heated by said heating means will be a predetermined amount above the temperature of said medium supplied to said space.

10. In a temperature changing system for a space, temperature changing means for changing the temperature of a heat exchange medium, means for circulating the said medium to said space, temperature controlling means between said temperature changing means and said space for affecting the temperature of said circulating heat exchange medium in a sense opposite to the change which is produced by said temperature changing means, thermostatic means responsive to a condition of said space for controlling said temperature controlling means, and apparatus for controlling the said temperature changing means including means responsive to the differential in temperature of the circulating heat exchange medium on opposite sides of said temperature controlling means.

11. In a temperature changing system for a space, conduit means for conveying a temperature changing medium to said space, temperature changing means for the medium conveyed through said conduit means, additional conduit means arranged in by-pass relation to said temperature changing means and joining said first named conduit means for mixing the temperature changing medium conveyed by said additional conduit means with that leaving said temperature changing means to provide a mixed temperature changing medium for delivery to said space, means for proportionally controlling the flow of said medium through each of said conduit means, thermostatic means responsive to the temperature of said space for controlling said flow controlling means, and differential temperature responsive means for controlling said temperature changing means comprising apparatus responsive to the difference in temperature of said mixed temperature changing medium and the temperature of said medium at said temperature changing means.

FRANCIS M. THUNEY.

REFERENCES CITED

The following references are of record in the file of this patent:

UNITED STATES PATENTS

| Number | Name | Date |
|---|---|---|
| 1,212,283 | Thum | Jan. 16, 1917 |
| 2,151,222 | Millard | Mar. 21, 1939 |
| 2,189,381 | McGrath | Feb. 6, 1940 |
| 2,246,138 | Lum | June 17, 1941 |
| 2,262,194 | Newton | Nov. 11, 1941 |
| 2,324,736 | Spence | July 20, 1943 |
| 2,327,536 | Locke | Aug. 24, 1943 |
| 2,366,501 | Gille | Jan. 2, 1945 |
| 2,393,868 | Niven | Jan. 29, 1946 |
| 2,404,597 | McClain | July 23, 1946 |